United States Patent [19]

Brownfield

[11] 4,117,828

[45] Oct. 3, 1978

[54] SOLAR COLLECTOR

[76] Inventor: Jerry A. Brownfield, 107 W. Rustic Lodge Ave., Minneapolis, Minn. 55409

[21] Appl. No.: 637,696

[22] Filed: Dec. 4, 1975

[51] Int. Cl.² .............................................. F24J 3/02
[52] U.S. Cl. ...................................... 126/270; 126/271
[58] Field of Search .................... 126/270, 271; 49/74, 49/89, 90

[56] References Cited

U.S. PATENT DOCUMENTS

| 102,633 | 5/1870 | Wheeler et al. | 126/271 |
|---|---|---|---|
| 385,689 | 7/1888 | Wright | 49/74 |
| 863,573 | 8/1907 | McCord | 49/74 |
| 1,240,890 | 9/1917 | Shuman | 126/271 |
| 1,423,982 | 7/1922 | Wolfe | 49/74 |
| 1,855,815 | 4/1932 | Abbot | 126/271 |
| 1,855,815 | 4/1932 | Abbot | 126/271 |
| 1,946,184 | 2/1934 | Abbot | 126/271 |
| 2,544,474 | 3/1951 | Swanton, Jr. | 126/271 |
| 2,783,682 | 3/1957 | Swenson | 126/271 |
| 2,969,788 | 1/1961 | Newton | 126/271 |
| 3,262,493 | 7/1966 | Hervey | 126/271 |
| 3,314,414 | 4/1967 | Rowekamp | 126/271 |
| 3,874,114 | 4/1975 | Rowell | 49/74 |
| 3,902,474 | 9/1975 | Pyle | 126/270 |
| 3,910,253 | 10/1975 | Thomason et al. | 126/271 |
| 3,934,323 | 1/1976 | Ford et al. | 126/271 |
| 3,980,071 | 9/1976 | Barber, Jr. | 126/271 |
| 3,981,445 | 9/1976 | Custer | 126/270 |

*Primary Examiner*—William R. Cline
*Assistant Examiner*—H. Jay Spiegel
*Attorney, Agent, or Firm*—Kinney, Lange, Westman & Fairbairn

[57] ABSTRACT

A solar collector having a housing and a plurality of substantially parallel heat absorbing vanes mounted in the housing immediately beneath a radiation transparent upper wall in such a manner as to form a plurality of relatively narrow channels through which a heat exchange fluid is circulated. The width of the channels is preferably not greater than one-half of the depth of the channels and is preferably substantially less. The width of the channels may be as little as one-sixth of the depth of the channels. Provision is made for changing the angular disposition of the vanes and this may be done by heat sensitive means sensitive to the direction of the solar radiation. One form of the vane is L-shaped in cross section with a short leg of each L constituting the bottom wall of the channel and the long leg constituting a side wall of the channel. The vanes may be formed with ears projecting therefrom, these ears constituting the means for spacing the channels and also providing the means for pivotally mounting the channels. These ears may be disposed in channel-shaped members, one set of which is fixed to provide a pivotal support for the vanes and the other set of which is movable to facilitate shifting the angular position of the vanes. The ear may be formed from either a flat strip on which is secured a cylindrical sleeve or the ear may be formed from an extension of the vane which has been curved into a generally cylindrical form.

11 Claims, 7 Drawing Figures

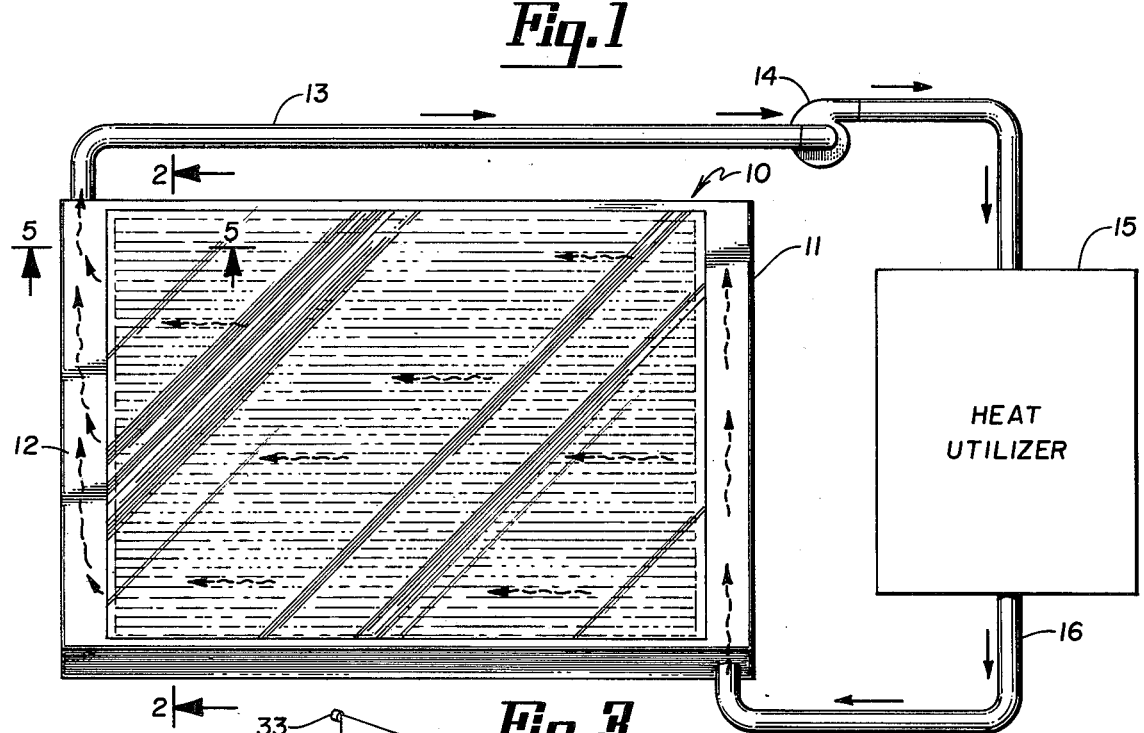
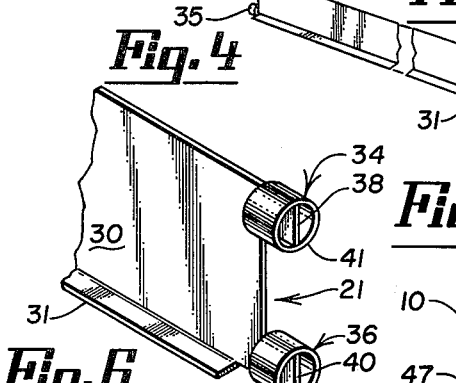
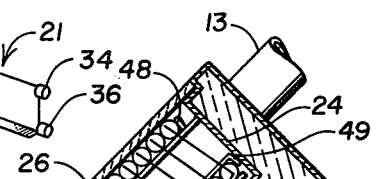
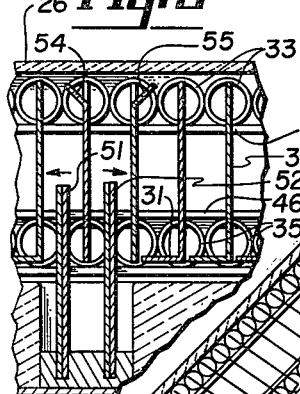
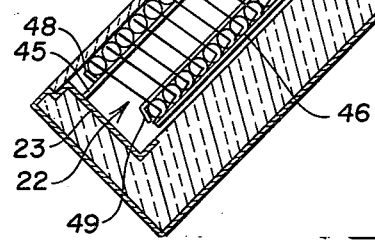
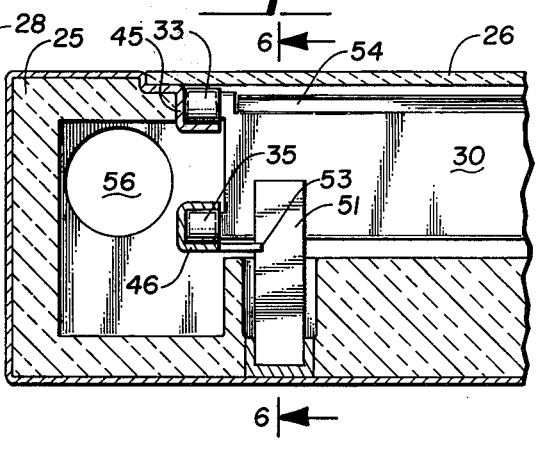

SOLAR COLLECTOR

BACKGROUND OF THE INVENTION

In forming a radiation collector, it is desirable to increase as much as possible the absorption of the collector while decreasing as much as possible the amount of heat lost from the collector. It has long been known that an excellent radiation absorber is a body having a hollow spherical cavity with a black wall and an opening to the cavity for receiving radiation which is extremely minute and minimizes as much as possible emission through the opening by radiation. While a hollow spherical cavity of this type is an ideal radiation absorber, it is very difficult to have it absorb any great amount of energy due to the minute opening leading to the interior of the cavity. Furthermore, it is difficult to effectively and continuously remove heat therefrom.

Where the radiation collector is a solar collector and it is desired to remove as much heat as possible from the collector, it is practically necessary to have some kind of heat exchange fluid which is circulated in contact with the walls of the radiation collector to continuously remove heat from the radiation collector as it is absorbed from the sun. This requires that the collector not only have as ideal characteristics as possible for effective absorption of energy but that it also has a form and shape which makes it possible to readily circulate a heat exchange fluid in heat exchange relation therewith. Furthermore, if any great amount of solar energy is to be absorbed, the construction must be one which makes it possible to provide a very large number of radiation absorbing cavities in a relatively small space in a structure which can be readily produced and which can be utilized under the available conditions commonly present for absorption of solar energy.

SUMMARY OF THE PRESENT INVENTION

The present invention provides for a highly efficient method of collecting solar energy by providing a collector in which there are a plurality of relatively narrow channels from which there is relatively little emission of radiation and providing a heat exchange system whereby the heat in the channels produced by absorption of solar energy is drawn off and conducted to a heat utilizing apparatus.

Specifically, I provide a plurality of substantially parallel radiation vanes mounted in a housing with the spacing between the vanes being not greater than one-half of the depth thereof and preferably substantially less. These vanes are mounted beneath a radiation transparent upper wall which is closely adjacent the upper portions of the vanes so as to define with the vanes a plurality of narrow channels. The housing preferably has an inlet manifold at one end thereof communicating with one set of extremities of the channels and an outlet manifold at the opposite end of the housing communicating with the opposite set of extremities of the channels with motor operated means for circulating a heat exchange fluid through the inlet manifolds, the channels and the outlet manifold to heat utilizing apparatus. Because of the use of a motor operated means for circulating heat exchange fluid, the channels can be relatively narrow thereby minimizing as much as possible the emission from the channels and maximizing the extent to which the air is able to remove heat from the walls of the channels.

In one form of the invention, I provide for L-shaped vanes, the long leg of the L of each vane constituting one side wall of the channel and the short leg the bottom of the channel. This provides a relatively simple way for obtaining the channel construction.

The vane members may be provided with ears which are of the same dimension transverse to the plane of the vane as the desired spacing between the vanes so that the ears function as a spacer to maintain the desired spacing between the vanes. At the same time, the ears provide a means for mounting the vanes and also for shifting the angular position of the vanes. The ears may be located in longitudinal members one set of which is fixed to pivotally support the vanes and the other set of which is movable to shift the angular position of the vanes.

The ears referred to above may be formed either by struck out flat portions from the vanes over which sleeves are placed or by striking out a portion of the vane and curling it to produce an ear of the desired shape.

Further objects and features of the invention will be apparent from a consideration of the accompanying specification, claims and drawing.

BRIEF DESCRIPTION OF THE DRAWING

FIG. 1 is a partially diagrammatic view showing my improved solar collector viewed from the front thereof;

FIG. 2 is a sectional view taken along the section line 2—2 of FIG. 1;

FIG. 3 is a perspective view of one vane element of my solar collector;

FIG. 4 is a view on a larger scale showing the end of one of the vanes shown in FIG. 3;

FIG. 5 is a fragmentary sectional view taken along the line 5—5 of FIG. 1;

FIG. 6 is another fragmentary sectional view taken along the line 6—6 of FIG. 5; and FIG. 7 is a view similar to that of FIG. 4 but showing a different modification.

DESCRIPTION OF THE PREFERRED EMBODIMENT

Referring first to FIG. 1, the numeral 10 is employed to indicate the heat collecting portion of my solar collector. This is provided with an inlet manifold 11 and an outlet manifold 12 connected to an outlet pipe 13 leading through a blower 14 which is motor operated to a heat utilizer 15. Fluid from the heat utilizer flows back through conduit 16 to the intake manifold 11. The heat utilizer may be any means for utilizing heat drawn from the thermal collector 10 by the heat exchange fluid. The fluid may, for example, be circulated in heat exchange relationship with some heat utilizing means in the heat utilizer 15.

Referring now to the details of the solar collector 10, this collector is shown in FIG. 2 in cross-sectional form, the section being taken along line 2—2 of FIG. 1. Referring to FIG. 2, the collector is shown as having a housing generally indicated by the reference numeral 20. Located within this housing 20 are a plurality of vanes 21 which, as will be pointed out later, are generally disposed so as to extend generally in in the direction of the radiation from the sun. The vanes 21 are disposed parallel to each other and form a plurality of relatively narrow channels through which heat exchange fluid is circulated. Vanes 21 are disposed within a chamber 22 within a housing 20, this chamber having end walls 23 and 24. A suitable heat insulating material 25 surrounds the chamber 22, being disposed between the chamber and the outer wall of the housing 20. Located over the vanes 21 is a radiation transparent pane 26 which may, for example, be of a glass capable of readily transmitting the radiation from the sun. The pane 26 is secured to the end walls 23 and to the housing in a fluid tight relationship so that the pane forms one wall of a plurality of channels through which the heat exchange fluid circulates. The housing is held at a desired angle with respect to a supporting surface by any suitable supporting means 28. While I have shown this supporting means in the form of a vertical supporting member engaging the under side of the housing 20, it is to be understood that in many cases, the support may be the roof of a buildng or the rafters of such a roof. The angle $\phi$ is selected so that when the vanes are disposed perpendicularly with respect to the bottom wall of the housing, they are directed generally in the direction of the sun when the sun is somewhat less than half way between sunrise and sunset. As will be pointed out, I may provide means for further adjusting the vanes to compensate for the varying position of the sun as it approaches and recedes from this midposition.

Referring now to the construction of the vanes 21, this is best shown in FIGS. 3 and 4. Each vane 21 is in the form of an elongated strip member 30. The strip member is preferably formed of any suitable material which is relatively rigid so as to maintain the desired spacing between the vanes and yet is as thin as possible. A typical such vane may be formed of aluminum which is 0.01 inches in thickness. It is to be understood that regardless of the material of which the vane is formed, it will be either treated or coated so as to have a dark finish, preferably as close to black as possible. In a preferred form of my invention, the vane is also provided with a horizontal portion 31 which is integrally formed with the main vertical portion 30. In other words, as best shown in FIG. 6, the vane is L-shaped in cross-section, the vertical portion 30 of the vane constituting the side wall and the short portion 31 of the L constituting the bottom wall. As will be apparent from FIG. 6, when the vane elements 21 are disposed closely adjacent to each other, they form a plurality of channels, the vertical or long walls 30 constituting the side walls of the channel and the short legs 31 constituting the bottom walls of the channel.

It is desirable that the vanes 21 be mounted for tilting action. In order to accomplish this, I provide two pairs of ears for each vane. The first pair of ears consists of ears 33 and 34 extending outwardly from the upper opposite corners of the vane. The second pair of ears 35 and 36 extend from the lower opposite corners of the vane. The construction of these ears is best shown in FIG. 4 in connection with ears 34 and 36. It will be noted that projecting from the vertical portion 30 of the fin 21 are two flat ears 38 and 40. These ears are formed of the material of the flange and can be readily formed during the stamping operation which stamps and cuts out the vane member 21. It will be noted that ears 38 and 40 are merely integral extensions of the vertical portion 30 of the vane 21. Secured to and surrounding the flat ears 38 and 40 are two cylindrical sleeves 41 and 42. These sleeves have several functions. In the first place, they act as pivotal bearings for the vane elements 21, as will be presently explained. In the second place, they act as spacers for the vanes 21. The diameter of these sleeves 41 and 42 corresponds to the desired lateral spacing between the vertical portions 30 of the vanes 21. The means for journalling the vanes 21 will now be described.

The upper ears 33 at one end of the vanes are mounted in a channel 45 which provides an L-shaped receptacle for the ears 33 as best shown in FIG. 5. The lower ears 35 at the same end of the vanes are secured in a channel shaped member 46 which provides a U-shaped channel. The U-shaped channel retains the vanes against vertical movement and retains the vanes in position. It is to be understood that a similar set of channels 45 and 46 (not shown) are disposed at the opposite end of the housing 11 and engage the ears 34 and 36, respectively. As best shown in FIG. 2, the upper channel 45 is provided with a pair of upturned stop members 48 which engage the outermost ears 34 and prevent lateral shifting of the ears. Furthermore, as will be observed from FIG. 2, the channel member 45 abuts against the end walls 23 and 24 of the chamber 22 and is stationery. In fact, it may form an integral extension of the outer housing member as shown in FIG. 5. Thus, the ears 33 and 34 are retained against movement transverse to the vanes 21.

Referring to the channels 46, it will be noted from FIG. 2 that the channels are provided with downturned lips 49 at opposite ends thereof to retain the ears 35 and 36 against lateral shifting. Channel 46 is, however, longitudinally shiftable. In the position shown in FIG. 2, the channel 46 is shown as having its upper end abutting against the right hand end of the chamber 22 whereas there is a substantial space at the left hand end of the channel 46 between that end of the channel and the left hand end of the wall of space 22. It is thus possible for the channel 46 to be moved longitudinally. Since the ears 35 are secured against lateral shifting with respect to channel 46, it will be obvious that when channel 46 is moved, the angular position of the vanes 21 is changed. As shown in FIG. 2, the vanes 21 are tilted slightly with respect to a position in which they are vertical with respect to the bottom wall of housing 20. If the channel 46 is moved until the left hand end thereof abuts the left hand end of space 22, the vanes will have passed through a position in which they are normal with respect to the bottom wall 20 to a position in which they are tilted in the opposite direction from that shown in FIG. 2. The channels 46, it will be noted, do not engage the bottom inner wall of the housing 20 are are suspended by the vanes 21 from the upper channels 45. The lower channel 46 thus float to compensate for the change in the vertical distance between the lower ends of the vanes and the upper ends as the vanes are tilted.

It is of course possible for the position of channel members 46 to be manually shifted or shifted automatically by any suitable means to compensate for the angular position of the sun between sunrise and sunset. In the present instance, I have shown a heat sensitive means for performing this function. Specifically, I have shown two bimetals 51 and 52 supported at their lower end in the housing in such a position that they are heated by radiation passing through the transparent panel 26. Both the bimetals 51 and 52 are operatively coupled to the channel 46 by engagement with ears 53 extending from the channel as best shown in FIG. 5 in connection with bimetal 51. Ear 53 is preferably slotted and the bimetal 51 extends through the slot in the ear 53. A similar arrangement is provided for coupling bimetal 52 to the channel member 46. As indicated in FIG. 6, the bimetal 51 tends when heated to move the channel member 46 to the right. Conversely, the bimetal member 52, when heated tends to move the channel 46 to the left. Thus, as far as any changes in ambient temperature are concerned, the two bimetals 51 and 52 balance each other out and cause no movement of the channel member 46. The bimetal member 52 is, however, designed to be affected by radiant energy to a greater extent than bimetal 51 and to cause under certain conditions shifting of the channel 46. The vane 21 disposed between the two bimetals 51 and 52 has a struck-out flange 54 which is designed to partially shield the bimetal 51 from the effects of the solar radiation. This flange should extend longitudinally over a sufficient portion of the vane to partially shield the bimetal 51 regardless of the angular position of the sun. A similar flange 55 is struck out from the vane 21 on the right hand side of the bimetal 52. Thus, the bimetal 52, over a wide range of positions of the earth with respect to the sun is designed to receive substantially greater radiation from the sun than is bimetal 51, the latter being partially protected from such radiation by the flange 54.

Considering the operation of the heat responsive means consisting of bimetals 51 and 52, the vanes 21 are shown in FIG. 2 in the position they assume when the sun is relatively low as, for example, in the morning. Under these conditions, the flange 54 is effective to fairly well shield bimetal 51. The bimetal 52 is tending to get a fair amount of radiation. As the sun rises, the bimetal 52 will be exposed to the sun to a greater and greater extent with the result that it will shift to the left in the direction of the arrow adjacent bimetal 52. This will cause the channel member 46 to shift to the left, gradually bringing the vanes to a position in which they are tilted in the opposite direction from that shown in FIG. 2. This is the position they assume when the sun is at its highest position. If the vanes move too far, the bimetal 51 will be exposed to a greater amount of heat from the sun with the result that the bimetal 51 will tend to oppose further movement of the channel 46 to the left by reason of the action of bimetal 52. As the sun begins to again lower in the sky, the bimetal 52 will receive less radiation than formerly and tend to move to the left to again cause the vanes to approach the position shown in FIG. 2. In this manner, the collective effect of the bimetals 51 and 52 is to cause the vanes to always assume a direction in which they generally extend in the direction of radiation from the sun. If the weight of the vanes is such, when the collector is disposed at an angle $\phi$ as shown in FIG. 2, as to impose too great a load on bimetals 51 and 52, any suitable biasing means, such as a spring between the inner ends of the vanes and the housing, may be provided to compensate for the weight of the vanes.

Referring now to the general overall operation of the device as a solar collector, it will be noted that the vanes 21 form a plurality of relatively narrow channels which are substantially closed at the bottom by the bottom walls 31 and the upper end of which is closed adjacent the radiation transparent member 26. The relative width of the vertical positions 30 of vanes 21 and the horizontal portion 31 is of extreme importance. It has been found that as a minimum, the vertical portion 30 should be at least twice as wide as the horizontal portion 31. A very desirable ratio is that of 6 to 1. At the same time, it is desirable to have a space in between the vanes of from ⅛ to ¼ of an inch. As previously pointed out, the vanes 21 will either be treated or coated in some way so that they have as high an absorptivity and as low an emissivity as possible. This is done by either treating or coating the vanes in any of various conventional manners employed to obtain high absorptivity and low emissivity. The reason for the ratio between the vertically extending portions and the horizontally extending portions of the vanes 21 is to approach as close as possible in a commercially feasible structure, the desirable condition of a black hollow sphere, in which the absorption is at a maximum and the losses are at a minimum. As has been pointed out above, such a hollow sphere with an infinitesimally small opening retains substantially all of the heat energy passing through the opening and radiates relatively little, if heat is removed from the cavity. The difficulty with such an arrangement is that it does not lend itself readily to the absorption of large amounts of heat due to the relatively small opening in the body. Furthermore, it also does not lend itself to the circulation of a heat exchange fluid through the cavity.

I have found that by providing relatively deep narrow channels, it is possible to obtain many of the advantages of a black hollow sphere while still permitting free circulation of a heat exchange fluid and providing for an arrangement in which large amounts of solar heat can be absorbed. If the ratio between the vertical portions 30 of the vanes 21 and the bottom portions 31 is less than two to one, the "view factor" will be too high so that there will be an excessive amount of re-radiation from the interior of the channels. On the other hand, if the ratio between the long side 30 of the vane and the horizontal side 31 is much greater than 6 to 1, the reduction of the "view factor" is not sufficient to offset other problems that result. As the width of the vertical side is increased, a question of structural rigidity enters in. It is obviously necessary that the sides 30 have sufficient rigidity that the space between the adjacent vanes is relatively uniform in width. If the strip becomes very wide, then it is necessary to increase the thickness of the material of which the strip is formed. On the other hand, it is desirable that the strip be as thin as possible to minimize conduction and to avoid the vanes taking up an excessive amount of space. The spacing between the vanes is also quite critical. If the space is much less than ⅛ of an inch, then an excessive amount of energy is required to force a heat exchange medium through the channels. On the other hand, if the vanes are space apart more than ¼ of an inch, assuming that air is being used as a heat exchange fluid, the heat is not as effectively removed from the channels since the wiping effect between the air and the walls of the channels is decreased, particularly at an intermediate area between the walls of the channels. Thus, assuming that a maximum spacing of ¼ of an inch between the vanes and assuming a maximum ratio of about 6 to 1 between the long sides 30 and the short sides 31 of the vanes, the maximum width of the long side of the vanes will be 1½ inches. With a width not in excess of this, it is possible to use relatively thin material such as 0.01 inch aluminum. Such material is readily available for this purpose and can be formed readily to the desired shape. The material is sufficiently thin that it does not conduct heat excessively to the surface and occupies a minimum amount of space.

Summarizing, I have found it desirable for the reasons discussed above that the channels be so formed that the ratio of the depth of the side walls to the width of the bottom walls is not less than two to one and preferably closer to 6 to 1. The width of the channel is preferably between ⅛ of an inch and ¼ of an inch. The material of the vane should be treated or coated so as to provide a surface having as high a solar radiation absorptivity and as low a long wave radiation emissivity as possible.

The solar collector is mounted so that the vanes generally are driected toward the sun. As previously pointed out, this may be done either by mounting the same on the ground with suitably supporting means to hold the collector at the proper angle φ with respect to the ground or the collector may be part of a roof structure of a building. The blower 14 is designed to circulate air through the intake manifold, the various passages defined by vanes 21, outlet manifold 21, the pipe 13, the blower 14 and a suitable heat utilizer 15. The blower lid designed to circulate the heat exchange fluid at an optimum speed for removing the absorbed heat from the channels. To collect the maximum amount of energy it is advantageous that the heat transfer fluid velocities are such that laminar flow is maintained between the vanes so as to minimize heat conduction and convention to the pane. As has been pointed out, the vanes 21 are initially tilted so that their outer ends are inclined in the direction shown in FIG. 2. As the sun rises, the heat responsive means consisting of bimetals 51 and 52 will gradually tilt the vanes in the opposite direction always tending to keep the vanes pointing generally in the direction of the sun. When the sun is at its maximum setting, the vanes will be tilted in a direction opposite to that shown in FIG. 2. As the position of the sun begins to fall again, the bimetal means will be effective to tilt the vanes back in the direction shown in FIG. 2.

MODIFICATION OF FIG. 7

In FIG. 7, I have shown a slightly modified form of vane 21. In this particular case, the ears 60 and 61 are formed by cutting away material at the end of the vane and rolling it in the shape shown in FIG. 7. The result is that it is no longer necessary to apply sleeves over flat ears as is shown in FIG. 4. The diameter of the ears 60 and 61 is basically the same as with ears 34 and 36 and the function of these ears is likewise the same. In other words, the ears function to space the vanes 21 the desired distance from each other and also to act as pivot points for the vanes for supporting the vanes and for enabling the angular position of the vanes to be adjusted.

CONCLUSION

It will be seen that I have provided a novel radiation collector which enables hat to be effectively obtained from a source of radiation such as the sun. The construction which I have provided provides for the maximum recovery of absorbed heat consistent with an economical design which is commercially feasible.

While I have shown certain specific embodiments of my invention, it is to be understood that this is solely for purposes of illustration and that the scope of the invention is limited solely by the appended claims.

I claim:

1. A solar collector for heating a gaseous fluid comprising a housing, a plurality of substantially parallel radiation absorbing, substantially non-reflective, vanes mounted in said housing with the spacing between said vanes being between one-half and one-sixth of the depth thereof, said vanes each having fixedly associated with the inner portion thereof an inner radiation absorbing, substantially nonreflective surface, said housing having a closed inner wall and a radiation transparent outer wall mounted closely adjacent and generally parallel to the outer portions of said vanes so as to define with said vanes and said inner radiation absorbing surface a plurality of relatively narrow, contiguous unobstructed channels, each open to direct radiation at said outer portions of said vanes, said housing having an inlet manifold at one end thereof communicating with one set of extremities of said channels and having an outlet manifold at the opposite end thereof communicating with the opposite set of extremities of said channels, and means for circulating a gaseous heat exchange fluid through said inlet manifold, said channels and said outlet manifold to heat utilizing apparatus, said spacing between said vanes being between one-eighth and one-fourth of an inch and the velocity of said fluid being sufficiently small that the flow of said gaseous fluid through said vanes is laminar.

2. The solar collector of claim in which there is means for changing the angular disposition of the planes of said vanes so as to cause the vanes forming the walls of said channels to tend to be directed towards the sun.

3. The solar collector of claim 2 in which the means for changing the angular disposition of the vanes is a radiation sensitive means sensitive to the direction of the solar radiation.

4. The solar collector of claim 3 in which the radiation sensitive means has a pair of opposing portions tending to oppositely affect the angular position of the vanes, for changes in ambient temperature, with means for shielding one of said portions from solar radiation, so that said radiation sensitive means is compensated for changes in ambient temperature.

5. The solar collector of claim 1 in which there is means for supporting said housing with respect to the earth at an angle such that the channels tend to be directed in the direction of the sun.

6. The solar collector of claim 1 in which each vane is L-shaped in cross-section with the short leg of the L constituting the inner wall of the channel and the long leg constituting a side wall of the channel.

7. The solar collector of claim 1 in which each vane has one pair of ears extending from the outer opposite corners of the vane and a second pair of ears extending from the inner opposite corners of the vane, each of said ears being in the form of a sleeve having a dimension transverse to the plane of the vane equal to the desired spacing between the vanes, a first set of longitudinal members engaging the inner ears of all of said vanes and a second set of longitudinal members engaging the outer ears of all of said vanes to maintain said vanes in position in said housing.

8. The solar collector of claim 7 in which one of said sets of longitudinal members is fixed to provide a pivoted mounting for said vanes and the other of said sets of longitudinal members is longitudinally slidable to tilt the vanes.

9. The solar collector of claim 7 in which the longitudinal members are channel-shaped members having channels into which said ears extend.

10. The solar collector of claim 7 in whcih each ear is a flat strip extending from the vane with a cylindrical sleeve surrounding and engaging said flat strip.

11. The solar collector of claim 7 in which each ear is formed of an extension of said vane which has been curved into a generally cylindrical form.

* * * * *